United States Patent [19]

Ashikaga et al.

[11] Patent Number: 5,726,437
[45] Date of Patent: Mar. 10, 1998

[54] LIGHT INTENSITY CONTROL DEVICE

[75] Inventors: Hideaki Ashikaga; Masao Ito, both of Ebina, Japan

[73] Assignee: Fuji Xerox Co., Ltd., Tokyo, Japan

[21] Appl. No.: 638,559

[22] Filed: Apr. 26, 1996

Related U.S. Application Data

[63] Continuation-in-part of Ser. No. 543,832, Oct. 16, 1995, abandoned.

[30] Foreign Application Priority Data

Oct. 27, 1994 [JP] Japan .................................. 6-263551
Oct. 26, 1995 [JP] Japan .................................. 7-278675

[51] Int. Cl.$^6$ .................................. G03G 15/043
[52] U.S. Cl. .................. 250/205; 372/38; 358/475; 250/234
[58] Field of Search ................ 250/205, 214 R, 250/208.2, 234, 235, 236; 372/31, 38, 26, 29, 33; 358/475, 474

[56] References Cited

U.S. PATENT DOCUMENTS 5,268,916  12/1993  Slawson et al. .................. 372/38
5,309,461   5/1994  Call et al. ........................ 372/38

Primary Examiner—Edward P. Westin
Assistant Examiner—John R. Lee
Attorney, Agent, or Firm—Oliff & Berridge, P.L.C.

[57] ABSTRACT

A light intensity control device includes light intensity balancing means for balancing the light intensities of the laser beams from the light emitting elements of the laser light source, and simultaneous operating means for simultaneously operating the light emitting elements of the laser light source, wherein the sum of the light intensities of the laser beams from the light emitting elements simultaneously operated by the simultaneous operating means is detected by single detecting means at one time, and is controlled according to the detection output from the detecting means. Accordingly, it is possible to reduce the time required to perform the control of light intensities of laser beams from semiconductor laser elements when the number of the laser beams is increased, thereby more greatly exhibiting the effect of high-speed operation obtained by the increase in number of the laser beams.

10 Claims, 15 Drawing Sheets

LIGHT INTENSITY CONTROL DEVICE

This is a Continuation-in-Part of application Ser. No. 08/543,832, filed Oct. 16, 1995, now abandoned.

BACKGROUND OF THE INVENTION

1. Field of the Invention

The present invention relates generally to a light beam recording and scanning device and a light beam radiating device used therein for recording an image by using a light source for generating light beams, such as a semiconductor laser or an LED array, and more particularly to a light intensity control device which can quickly control the light intensities of plural light beams generated from the light source, can be manufactured with a simple configuration to allow size reduction and cost reduction of the device, and can improve the control accuracy for the light intensities.

2. Description of the Related Art

There is shown in FIG. 7 a conventional semiconductor laser scanning device used in a laser image forming apparatus. As shown in FIG. 7, a semiconductor laser light source 100 is modulated according to an image signal generated from a laser driver 101 and emits a laser beam LB. The laser beam LB is led to a deflection scanning device 103 by a first optical system 102, and is deflected by the deflection scanning device 103 to scan at a constant scanning speed in a horizontal scanning direction. The laser beam LB deflected to scan by the deflection scanning device 103 is focused by a second optical system 104 such as an f-θ) lens to form spot images 106 on a photosensitive drum 105 rotating at a given speed in a vertical scanning direction, thus forming an electrostatic latent image on the photosensitive drum 105 according to image information. The electrostatic latent image formed on the photosensitive drum 105 is developed to thereby form a visible image.

In the laser image forming apparatus mentioned above, there have been proposed in recent years various techniques on the semiconductor laser light source 100 to allow higher-speed image formation by using a configuration capable of emitting a plurality of laser beams LB.

FIG. 8 shows an example of the semiconductor laser light source 100 capable of emitting a plurality of laser beams LB. The semiconductor laser light source 100 shown in FIG. 8 is constructed by enclosing in a package a semiconductor laser array 110 consisting of a plurality of semiconductor laser elements integrally formed on one chip.

The deflection scanning device 103 shown in FIG. 7 is of a type such that a polygonal mirror is rotated; however, many other types have been invented to be put to practical use. For example, the types include a type such that an optical diffraction grating such as a hologram disk is rotated and a type such that an electric field or a sonic wave is applied to a nonlinear optical element.

Reference numeral 120 shown in FIG. 7 denotes a beam detector provided to synchronize the scanning of the spot images 106 on the photosensitive drum 105 in the horizontal scanning direction. The beam detector 120 can detect the spot images 106 in a pre-scanning stage until the spot images 106 scan the surface of the photosensitive drum 105 in the horizontal scanning direction to reach an image region on the photosensitive drum 105.

The semiconductor laser light source 100 used as a light source for the semiconductor laser scanning device as mentioned above has a property such that the light intensity of the laser beam LB tends to be fluctuated by the influence of self-heating or ambient temperature as shown in FIG. 9. Therefore, it is necessary to maintain the light intensity of the laser beam LB at a constant value and form an exposure image without non-uniformity of density in forming the image according to image information on the photosensitive drum 105 by applying the laser beam LB onto the photosensitive drum 105. In particular, in the laser image forming apparatus using a plurality of laser beams LB, it is important to set the light intensities of the plural laser beams to a given value.

Some techniques on the light intensity control for maintaining the light intensity of the laser beam from the semiconductor laser element are disclosed in Japanese Patent Laid-open Nos. 56-105686, 56-140477, and 59-19252, for example. As a conventional control method for the light intensity as disclosed in these literatures and yielded great results, light intensity detecting elements having a photodetecting area capable of receiving a plurality of laser beams is used to sequentially detect the laser beams sequentially emitted from a plurality of semiconductor laser elements, and the light intensities of the laser beams detected are sequentially compared with a preset reference level. Then, the semiconductor laser elements are controlled to be driven so that the detection values of the laser beams become equal to the reference level.

FIG. 10 is a block diagram showing a conventional light intensity control device.

Referring to FIG. 10, reference numerals 111, 112, and 113 denote a plurality of semiconductor laser elements constituting the semiconductor laser array 110. These semiconductor laser elements 111, 112, and 113 are connected to laser driving circuits 120, 121, and 122, respectively. The laser driving circuits 120, 121, and 122 serve to modulate and control the semiconductor laser elements 111, 112, and 113, respectively. Each of the laser driving circuits 120, 121, and 122 includes sequential operating means 138. The sequential operating means 138 has selecting elements 124 for sequentially selecting image data, operation signal, or light shutoff signal. The signal selected by the selecting elements 124 is input into modulating means 126, and the semiconductor laser element 111 is modulated by the modulating means 126. Further, light intensity setting means 125 is connected to the modulating means 126, and the light intensity in modulating the semiconductor laser element 111 is set by the light intensity setting means 125.

Laser beams emitted from the semiconductor laser elements 111, 112, and 113 are detected by light intensity detecting means 114 provided in optical paths of the laser beams. The laser beams detected by the light intensity detecting means 114 are converted into electrical signals, which are in turn amplified by an amplifier 115 and then converted into digital signals by an A/D converter 116. Each of the digital signals output from the A/D converter 116 as a photodetection signal is compared with a reference signal generated from reference signal generating means 131 by comparing means 117. The result of comparison obtained by the comparing means 117 is switched by switching means 132 and input into one of D/A converters 118, 134, and 135. Then, the digital signals are converted into analog signals according to the result of comparison by the D/A converters 118, 134, and 135. The analog signals output from the D/A converters 118, 134, and 135 are input through low-pass filters 119, 136, and 137 into the light intensity setting means 125 in the laser driving circuits 120, 121, and 122, respectively. Then, the light intensity setting means 125 in the laser driving circuits 120, 121, and 122 adjust the light intensities of the laser beams emitted from the semiconductor laser elements 111, 112, and 113 according to the analog signals input through the low-pass filters 119, 136, and 137, respectively. A timing signal 140 is input through switching means 133 into the selecting means 124 in the laser driving circuits 120, 121, and 122 and into the D/A converters 118, 134, and 135.

The operation of the conventional light intensity control device shown in FIG. 10 will now be described. The timing signal 140 is selectively input through the switching means 133 into the laser driving circuit 120. At the same time, the switching means 133 instructs the laser driving circuits 121 and 122 to turn off the semiconductor laser elements 112 and 113. The laser driving circuit 120 operates the sequential operating means 138 incorporated therein in receipt of the timing signal 140 to feed an operation signal to the modulating elements 126, thus operating the corresponding semiconductor laser element 111 only.

The laser beam emitted from the semiconductor laser element 111 enters the light intensity detecting means 114 provided in the optical path of the laser beam, and the light intensity of the laser beam is converted into a current value by the light intensity detecting means 114. Then, the current value is suitably amplified and converted into a voltage value by the amplifier 115. The voltage value is then converted into a digital value by the A/D converter 116, and the digital value is fed as a detection output of light intensity to the comparing means 117.

Then, the comparing means 117 compares the detection output with a reference signal generated from the reference signal generating means 131, and instructs the D/A converter 118 to decrease the light intensity when the detection output is larger than the reference signal, increase the light intensity when the detection output is smaller than the reference signal, or hold the light intensity when the detection output is equal to the reference signal. At this time, the switching means 132 is set so as to transmit the output from the comparing means 117 to the D/A converter 118 only. The D/A converter 118 incorporates set value changing means, which decreases its set value when instructed to decrease the light intensity, increases the set value when instructed to increase the light intensity, or holds the set value when instructed to hold the light intensity. Only when the timing signal 140 remains input, the D/A converter 118 receives the instruction from the comparing means 117 to increase, decrease, or hold the set value, and outputs the analog signal to the low-pass filter 119 according to the set value now changed or held. When the input of the timing signal 140 is ended, the D/A converter 118 does not receive the instruction from the comparing elements 117, but continues to hold the present set value and output the analog signal according to the present set value.

The light intensity setting means 125 supplies a constant current to the modulating means 126 according to the output from the D/A converter 118 whose noise component has been removed by the low-pass filter 119.

Finally, the modulating means 126 modulates the current supplied from the light intensity setting means 125 according to the signal from the sequential operating means 138, and supplies the modulated current to the semiconductor laser element 111, thus driving it.

Having thus described the procedure of the light intensity control on the semiconductor laser element 111, the timing signal 140 sequentially operates the laser driving circuits 121 and 122 to similarly perform the light intensity control also on the semiconductor laser elements 112 and 113.

However, the above-mentioned prior art has the following problems. The first problem is such that when the number of the laser beams emitted from the semiconductor laser light source 100 is increased, the time required to perform the light intensity control for the semiconductor laser becomes long because the light intensities of the laser beams from the semiconductor laser elements 111, 112, and 113 must be individually controlled. The second problem is such that when the number of the laser beams is increased, the configuration becomes complicated to cause size increase and cost increase of the device.

Another problem is that the control accuracy for the total light quantity of a plurality of laser beams is low. In the above prior art, the D/A converter is used in controlling the light intensities of the laser beams from the semiconductor laser elements. The resolution of the D/A converter is not infinitesimal. For example, as shown in FIG. 18, the resolution is a discontinuous value quantized by every about 0.5% (0.05 mW) for a target light quantity of 10 mW. Accordingly, even after the light intensity control is finished by repeating the control by the number of laser beams, there is a possibility that a maximum error corresponding to the resolution of the D/A converter may remain in each laser beam. When the positive errors and the negative errors in all the laser beams are equal to each other, there is no serious problem because these errors are mutually canceled. However, in the worst case, there is a possibility that the errors in all the laser beams due to the resolution of the D/A converter may be deviated to either the positive side or the negative side and these positive or negative errors may be accumulated. In this worst case, the error of the total light quantity of the laser beams becomes as follows:

Error of the total light quantity=(The resolution of the D/A converter)×(The number of the laser beams).

Accordingly, if the resolution of the D/A converter is low, or the number of the laser beams is large, the error of the total light quantity becomes very large, causing a large variation in the total light quantity of the laser beams. For example, when the resolution of the D/A converter is set to 0.05 mW, and a semiconductor laser array formed by linearly arranging many semiconductor lasers is used as the light source for radiating light beams, the error of the total light quantity of the laser beams is increased up to 50 mW provided that the number of the laser beams is set to 1000. Further, if the error of the total light quantity of the laser beams becomes excessive, there occurs a problem in a color light beam recording and scanning device such that images of four colors of yellow, magenta, cyan, and black are superimposed to record a color image. That is, in sequentially making exposure to the laser beams corresponding to yellow and magenta, for example, the total light quantities of the laser beams become largely different between these different colors. As a result, color balance is lost to cause the appearance of a reddish image or a bluish image, for example, thus remarkably deteriorating the image quality.

To solve these problems, it is considered to increase the resolution of the D/A converter. However, this causes a new problem that the cost of the device is increased.

More specifically, the first problem is caused by the fact that the procedure of the light intensity control including the detection of the light intensity of the laser beam from the semiconductor laser element, the comparison between the detected light intensity and the reference level, and the control of the light intensity according to the result of comparison, must be repeated plural times corresponding to the number of the laser beams. While the primary object of increasing the number of the laser beams is to attain high-speed operation of the semiconductor laser scanning device as mentioned above, the requirement of much time for the light intensity control becomes a cause of hindrance against the high-speed operation.

On the other hand, the second problem is caused by the fact that the plural switching means for switching the timing signal and the result of comparison from the comparing means and the plural setting means for setting the light intensities such as the D/A converters and the low-pass filters must be provided in number corresponding to the number of the laser beams. The recent demands on the semiconductor laser scanning device include not only the high-speed operation, but also size reduction and cost reduction of the device. However, the increase in the number of the laser beams for the purpose of the high-speed operation invites size increase and cost increase of the device.

SUMMARY OF THE INVENTION

It is accordingly an object of the present invention to provide a light intensity control device which can reduce the time required to perform the control of light intensities of laser beams from semiconductor laser elements when the number of the laser beams is increased, thereby more greatly exhibiting the effect of high-speed operation obtained by the increase in number of the laser beams.

It is another object of the present invention to provide a light intensity control device which can be manufactured with a simple configuration, thereby allowing size reduction and cost reduction of a semiconductor laser scanning device.

According to the present invention, there is provided in a light intensity control device comprises total light quantity detecting means for detecting a total light quantity of a plurality of light beams simultaneously generated from a light source having a plurality of light emitting elements for generating the plurality of light beams; light intensity balancing means for adjusting a variation in light intensity between the light emitting elements of the light source; and control means for simultaneously turning on the light emitting elements whose variation in light intensity has been adjusted by the light intensity balancing means, controlling the total light quantity detecting means to detect the total light quantity of the light beams from the light emitting elements turned on, and adjusting the total light quantity of the light beams from the light emitting elements according to a detection value output from the total light quantity detecting means.

In the light intensity control device according to the present invention, the light emitting elements of the laser light source are simultaneously operated by the simultaneous operating means. Then, the sum of the light intensities of the laser beams emitted from the light emitting elements simultaneously operated is detected by the single detecting means, and a detection output from the detecting means according to the sum of the light intensities is fed to the comparing means. Then, the comparing means compares the detection output from the detecting means with the reference signal, and the result of comparison obtained by the comparing means is fed to the setting means. Finally, the setting means increases or decreases the light intensities of the laser beams from the light emitting elements of the laser light source according to the result of comparison obtained by the comparing means, thus controlling the light intensities.

According to the present invention, the intensities of the light beams from the light source can be quickly controlled to thereby realize high-speed control. Furthermore, since the configuration can be simplified, the device can be reduced in size and cost. In addition, since the total light intensity is controlled, a variation in the total light intensity can be suppressed without an increase in resolution of the D/A converter.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 2:
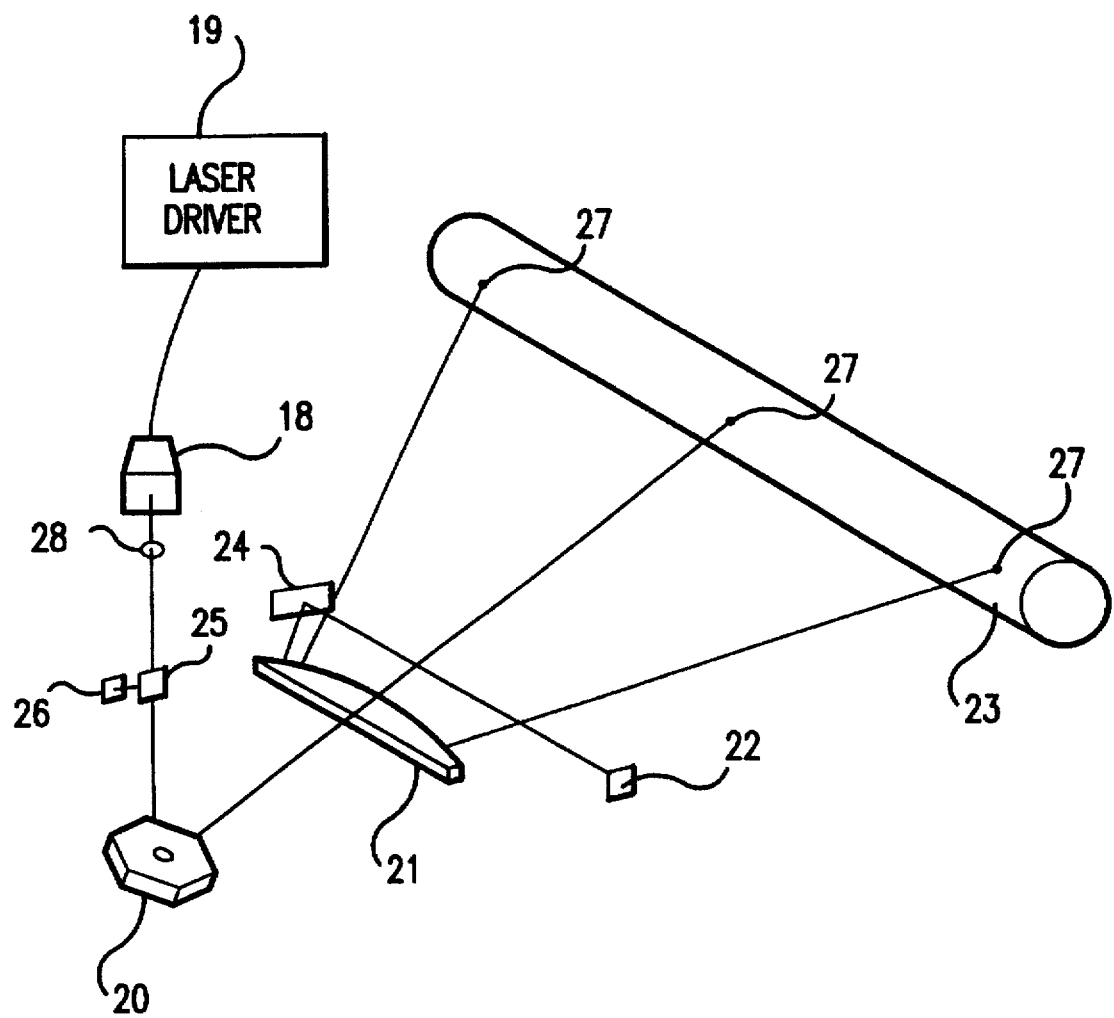
FIG. 2 is a perspective view showing a laser image forming apparatus in a preferred embodiment, where the light intensity control device according to the present invention is applied.

FIG. 2 shows a multibeam laser image forming apparatus employing a light intensity control device in a preferred embodiment according to the present invention.

Figure 3:
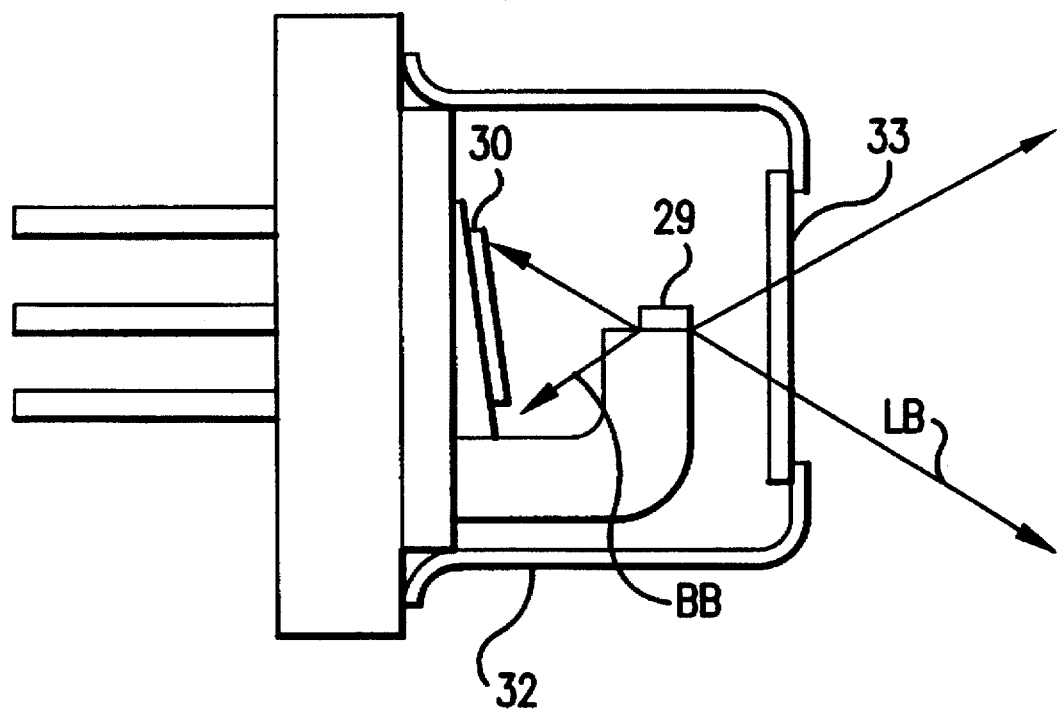
FIG. 3 is a sectional side view showing a semiconductor laser light source in the present invention.

Referring to FIG. 2, reference numeral 18 denotes a semiconductor laser light source. The semiconductor laser light source 18 emits a plurality of laser beams BB modulated by a laser driver 19 according to a data signal. The data signal includes many kinds of information such as image data read by an image reading apparatus, image data of computer graphics, and character information. As shown in FIG. 3, the semiconductor laser light source 18 is constructed by enclosing in a package 32 a semiconductor laser array 29 formed by arranging a plurality of semiconductor laser elements in a direction perpendicular to the plane of the sheet of FIG. 3 on one chip. The semiconductor laser array 29 emits a plurality of laser beams BB from a window 33 in a forward direction, and also slightly emits a plurality of back beams BB in a rearward direction. Light intensity detecting means 30 functions to capture the back beams BB and detect the intensity of emitted light from the semiconductor laser array 29. The light intensity detecting means 30 is located so that it can simultaneously detect all the back beams BB emitted rearward from the plural semiconductor laser elements. In the case of using the semiconductor laser light source 18 incorporating the light intensity detecting means 30, it is unnecessary to use a half mirror-25 and light intensity detecting means 26 shown in FIG. 2 as will be hereinafter described.

As shown in FIG. 2, the plural laser beams LB emitted from the semiconductor laser light source 18 are led through a first optical system 28 and the half mirror 25 to a deflection scanning device 20 formed as a polygonal mirror, and are deflected to scan in a horizontal scanning direction at a constant scanning speed by the deflection scanning device 20. The first optical system 28 is usually composed of a collimator lens for making the laser beams LB substantially parallel to each other, an aperture for making the beam diameters equal to each other, and a cylinder lens for substantially focusing the laser beams LB on a reflecting surface of the deflection scanning device 20 in a vertical scanning direction. However, the first optical system 28 may be composed of one or two of the above components according to object.

The half mirror 25 functions to partially lead the laser beams LB to the light intensity detecting means 26. The light intensity detecting means 26 is provided in a plurality of optical paths of the plural laser beams LB from the semiconductor laser light source 18, and is located so that it can simultaneously detect all the laser beams LB.

While the deflection scanning device 20 is of a type such that the polygonal mirror is rotated as in this preferred embodiment, the device 20 may be of a type such that an optical diffraction grating such as a hologram disk is rotated, or of a type such that an electric field or a sonic wave is applied to a nonlinear optical element.

The laser beams LB deflected to scan by the deflection scanning device 20 are focused by a second optical system 21 such as an fθ lens to form spot images 27 on a photosensitive drum 23 as a body to be scanned (to be hereinafter referred to as a scanned body) rotating at a given speed in the vertical scanning direction, thus forming an electrostatic latent image on the photosensitive drum 23 according to image information. Then, the electrostatic latent image formed on the photosensitive drum 23 is developed to form a visible image.

The second optical system 21 has an f-θ characteristic so that the spot images 27 usually scan the photosensitive drum 23 at a constant speed, and is designed so that the reflecting surface of the deflection scanning device 20 and the surface of the photosensitive drum 23 as the scanned body are in substantially conjugate relationship to each other in the vertical scanning direction. The second optical system 21 may have various configurations such as a combination of plural lens, a configuration of plural combined lens and a cylindrical mirror, or a configuration of a single lens.

The scanned body 23 is usually formed from a body changing its physical or chemical characteristics in receipt of light to allow recording of information. For example, an electrophotographic photosensitive body utilizing photoconductivity or a silver-salt coated photographic film may be used as the scanned body 23.

Referring to FIG. 2, reference numeral 22 denotes a beam detector provided to decide a start timing of scanning of the spot images 27 formed on the photosensitive drum 23 and synchronize the scanning of the spot images 27 in the horizontal scanning direction. The beam detector 22 is located so that it can detect the spot images 27 through a mirror 24 in a prescanning stage until the spot images 27 scan the surface of the photosensitive drum 23 in the horizontal scanning direction to reach an image region on the photosensitive drum 23.

The light intensity control device applied to the laser image forming apparatus as mentioned above has the following configuration. That is, in a semiconductor laser scanning device including a laser light source having a plurality of light emitting elements for generating a plurality of laser beams, single detecting means for detecting light intensities of the plurality of laser beams generated from the laser light source, comparing means for comparing a detection output from the detecting means with a reference signal, and setting means for setting the light intensities of the laser beams from the light emitting elements of the laser light source according to an output from the comparing means; there is provided a light intensity control device comprising light intensity balancing means for balancing the light intensities of the laser beams from the light emitting elements of the laser light source, and simultaneous operating means for simultaneously operating the light emitting elements of the laser light source, wherein the sum of the light intensities of the laser beams from the light emitting elements simultaneously operated by the simultaneous operating means is detected by the single detecting means at one time, and is controlled according to the detection output from the detecting means.

Figure 1:
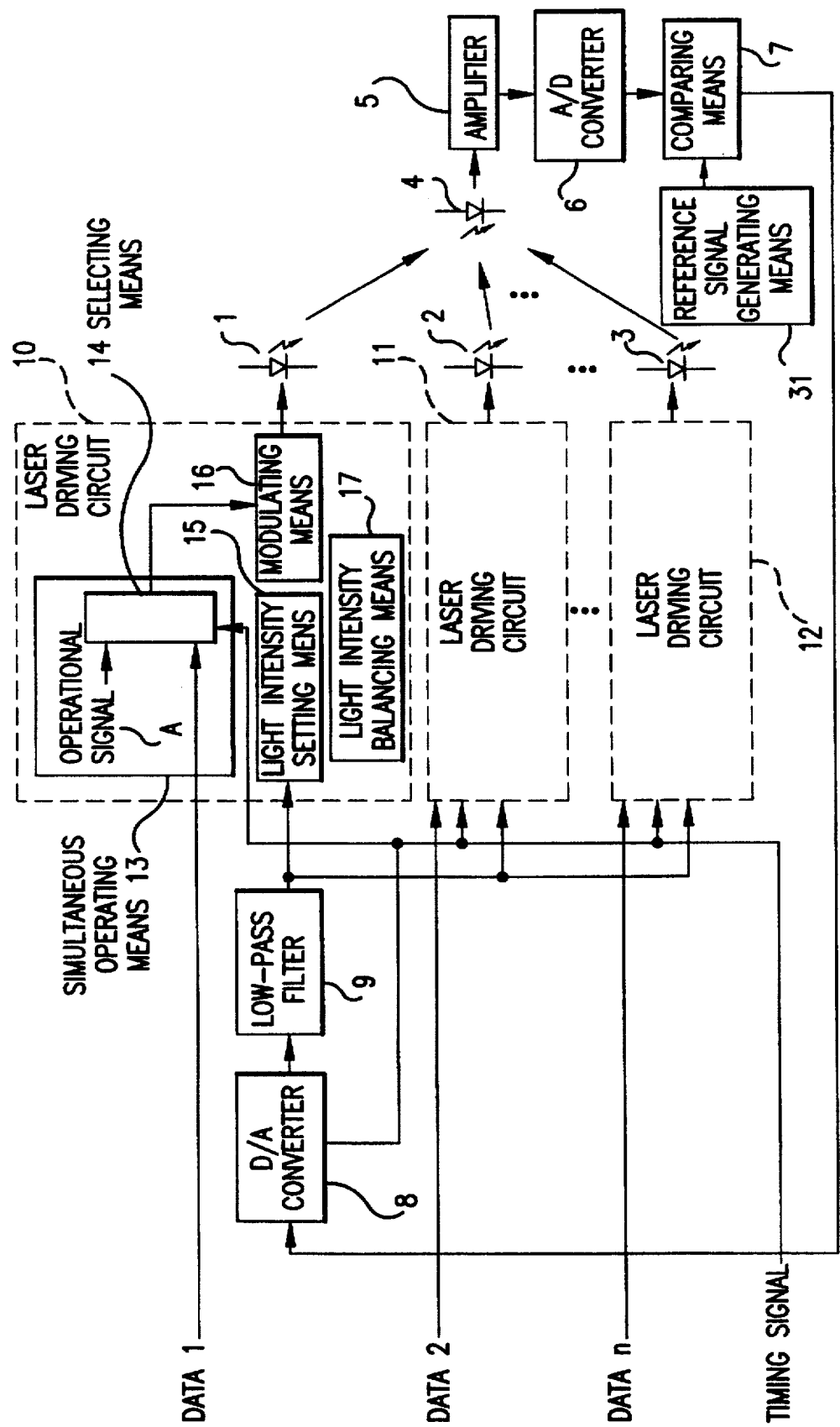
FIG. 1 is a block diagram showing a light intensity control device in a preferred embodiment according to the present invention.

FIG. 1 shows a preferred embodiment of the light intensity control device according to the present invention.

Referring to FIG. 1, reference numerals 1, 2, and 3 denote a plurality of semiconductor laser elements constituting the semiconductor laser array 29. The light intensities of plural laser beams LB emitted from the semiconductor laser elements 1, 2, and 3 are detected by light intensity detecting means 4 provided in optical paths of the plural laser beams LB. The light intensity detecting means 4 is either the light intensity detecting means 26 shown in FIG. 2 or the light intensity detecting means 30 shown in FIG. 3. The light intensity detecting means 4 is constructed of a photoelectric converting element, and a photodiode is usually used as the photoelectric converting element.

The light intensity detecting means 4 having detected the light intensities of the laser beams LB emitted from the semiconductor laser elements 1, 2, and 3 generates a detection output according to the sum of the light intensities. The detection output from the light intensity detecting means 4 is amplified by an amplifier 5, converted into a digital value by an A/D converter 6, and compared with a reference signal from reference signal generating means 31 by comparing means 7. The result of comparison from the comparing means 7 is output to a D/A converter 8. The D/A converter 8 incorporates set value changing means (not shown) designed to decrease its set value when the output from the light intensity detecting means is larger than the reference signal or increase the set value when the output from the light detecting means 4 is smaller than the reference signal.

The amplifier 5 functions not only to adjust the detection output from the light intensity detecting means 4 so that it falls within an input level of the A/D converter 6, but also to convert a current value from the light intensity detecting means 4 as the detection output therefrom into a voltage value. Since the A/D converter 6 is generally designed to input a voltage, the amplifier 5 is usually constructed of a transistor or an OP amplifier.

The reference signal generating means 31 may be realized by any means capable of holding a given digital value, such as a RAM, ROM, or DIP switch. It is necessary to set and select a value to be held and an address value for the RAM or only an address value for the ROM by using a controller such as a CPU. In this case, the reference signal generating means 31 may be used in an advanced manner such that a plurality of set values are held and one of them is suitably selected according to situation.

A low-pass filter 9 removes a noise component contained in an output from the D/A converter 8 and generates signals to light intensity setting means 15 incorporated in laser driving circuits 10, 11, and 12. The light intensity setting means 15 supplies constant currents to modulating means 16 according to the signals from the low-pass filter 9.

In this preferred embodiment, the light intensity control device further includes light intensity balancing means 17 for preliminarily balancing the light intensities of the laser beams from the light emitting elements of the laser light source according to the emission characteristics of the light emitting elements.

Figure 4:
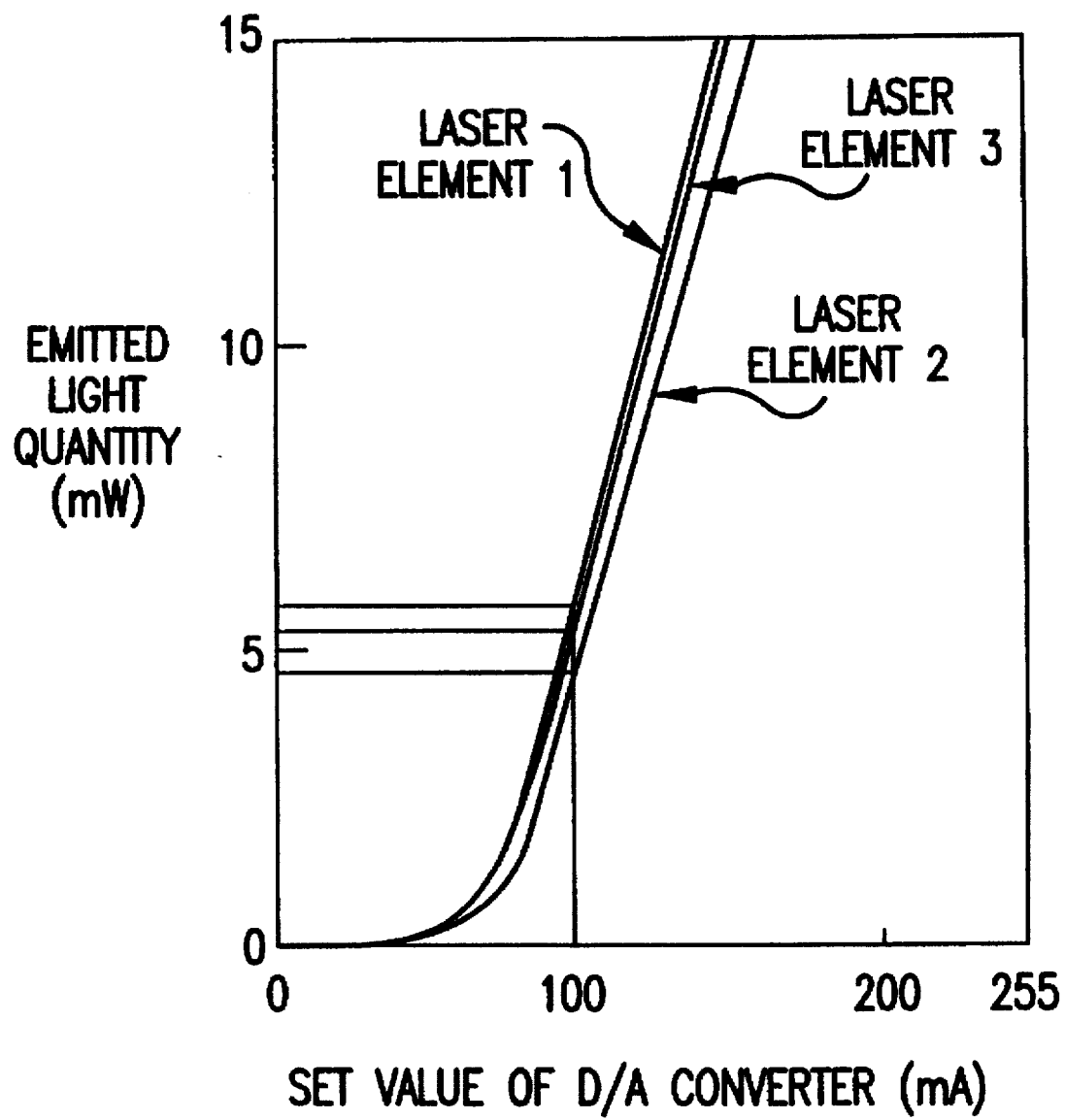
FIG. 4 is a graph showing the emission characteristics of semiconductor laser elements in the present invention.

The light intensity balancing means 17 is connected to the light intensity setting means 15 so as to finely adjust the current value to be generated from the light intensity setting means 15. The semiconductor laser elements 1, 2, and 3 of the semiconductor laser light source 18 are subtly different as shown in FIG. 4. This difference is caused by a subtle difference in characteristics between the semiconductor laser elements 1, 2, and 3 and a subtle difference in characteristics between the laser driving circuits 10, 11, and 12. For example, when the set value of the D/A converter 8 is 100, the graph of FIG. 4 shows that the quantities of light emitted from the laser elements 1, 2, and 3 are 6.0 mW, 5.4 mW, and 4.6 mW, respectively. By adjusting the light intensity balancing means 17 to make the characteristics of the laser elements 2 and 3 substantially the same as the characteristics of the laser element 1, the quantities of light emitted from the laser elements 1, 2, and 3 can be set to 6.0 mW even when the same control is applied to the laser elements 1, 2, and 3. In this manner, the light intensities of the laser beams from the semiconductor laser elements 1, 2, and 3 can be controlled to become always equal to each other in spite of the fact that the D/A converter 8 and the low-pass filter 9 are provided commonly for the laser elements 1, 2, and 3.

Simultaneous operating means 13 incorporates selecting means 14 for selecting a data signal or a light emission signal (operation signal) according to a timing signal.

Figure 5:
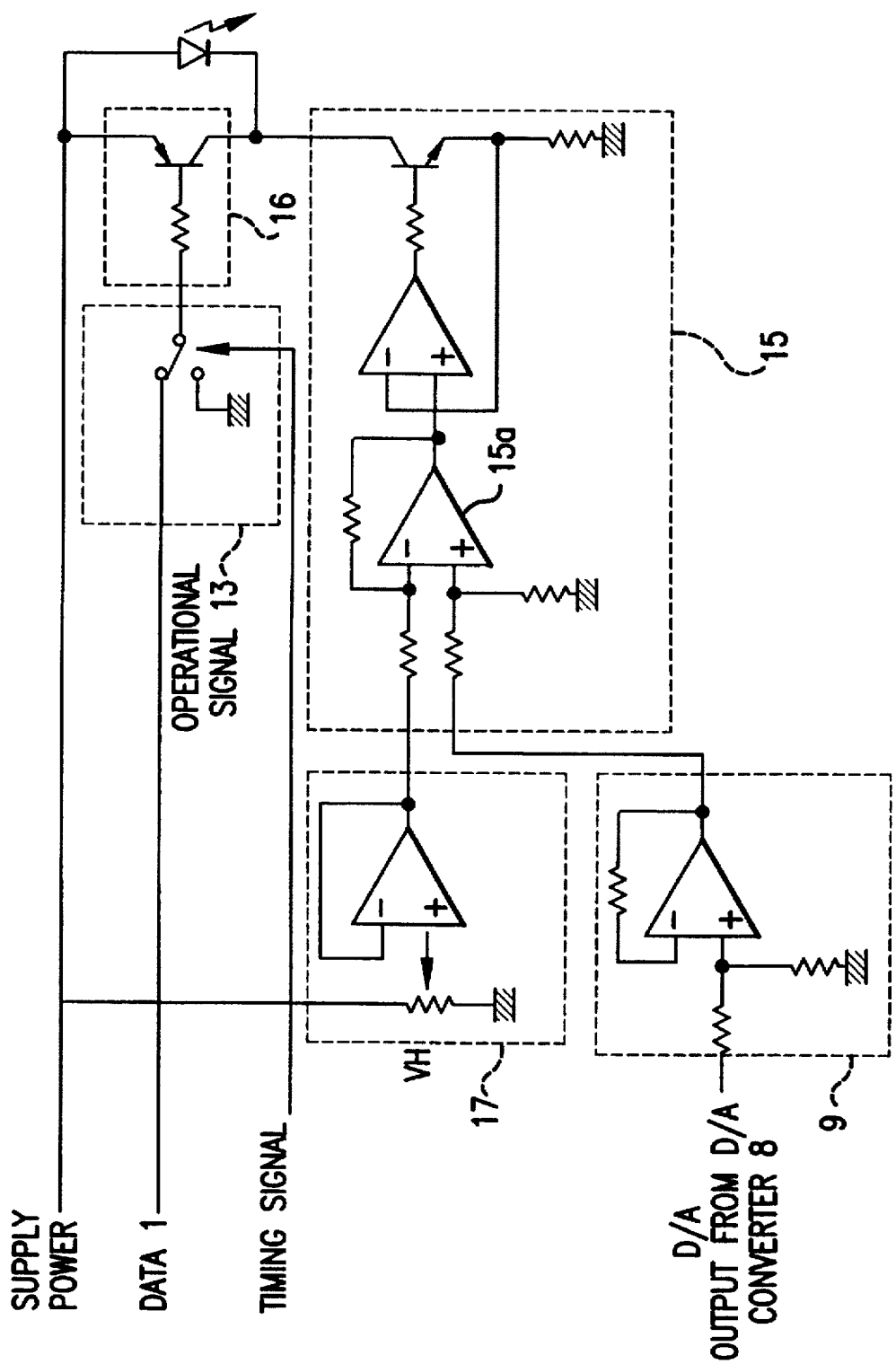
FIG. 5 is a circuit diagram showing an essential part of the light intensity control device as an example in the preferred embodiment.

FIG. 5 is a circuit diagram showing an example of a specific circuit configuration of the low-pass filter 9, the light intensity setting means 15, the modulating means 16, the light intensity balancing means 17, and the simultaneous operating means 13. In this example, the light intensity balancing means 17 adjusts the resistance value of a variable resistor VR according to the emission characteristics of the semiconductor laser elements 1, 2, and 3, thereby balancing the light intensities. Further, the light intensity setting means 15 includes an adding circuit 15a for adding a voltage value set by the light intensity balancing means 17 to a voltage output from the low-pass filter 9.

Figure 6:
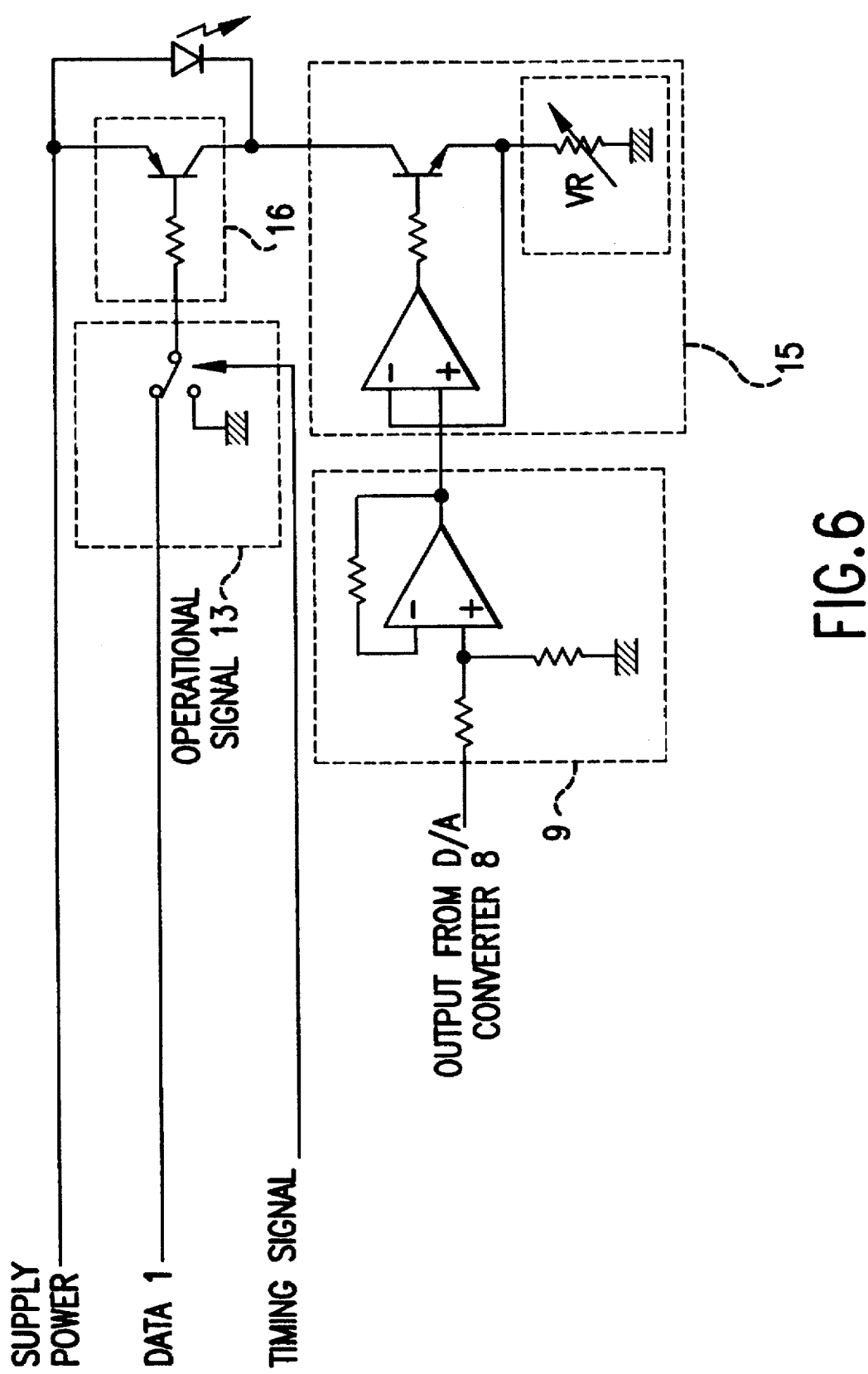
FIG. 6 is a circuit diagram showing an essential part of the light intensity control device as another example in the preferred embodiment.
Figure 7:
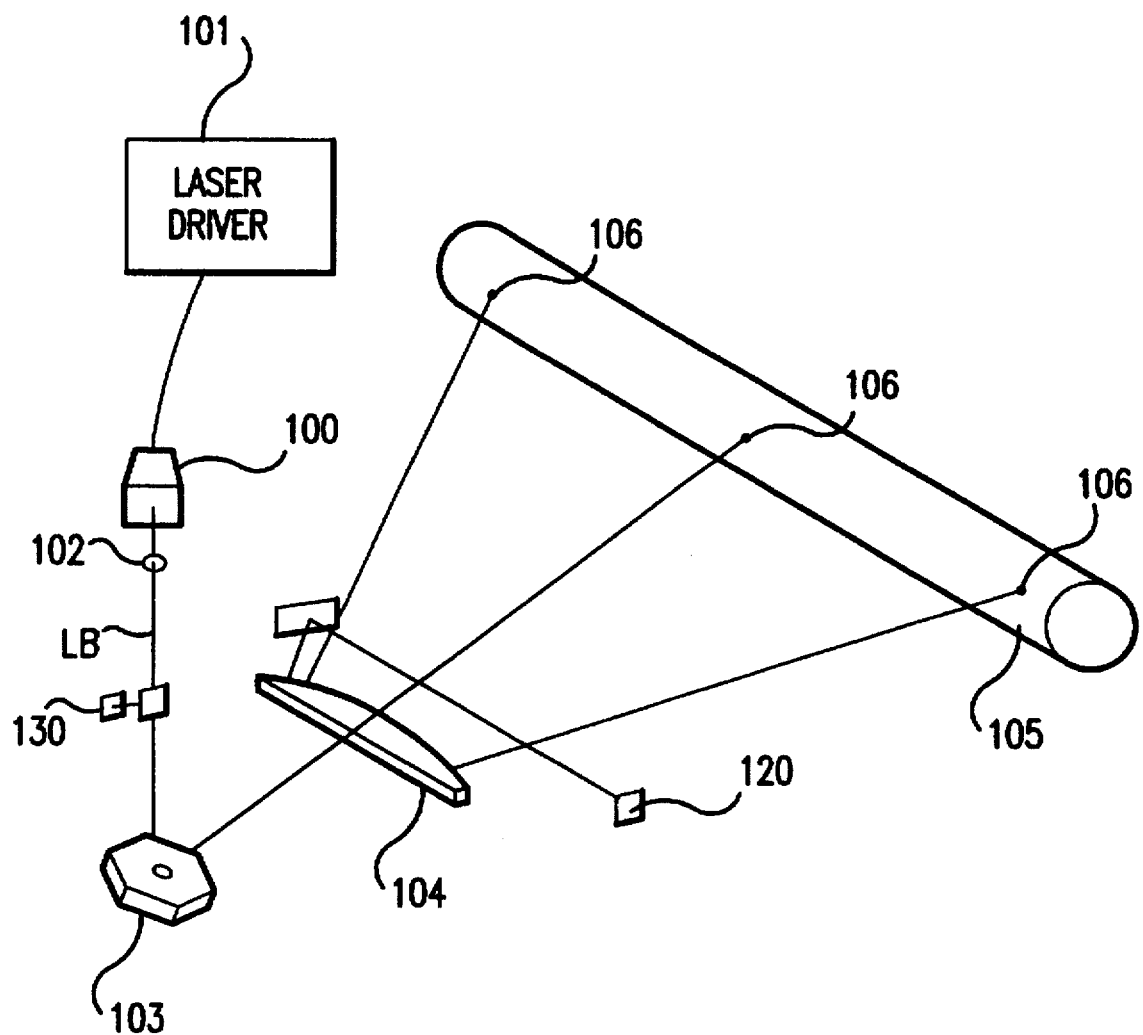
FIG. 7 is a perspective view showing a laser image forming apparatus to which a conventional light intensity control device is applied.
Figure 8:
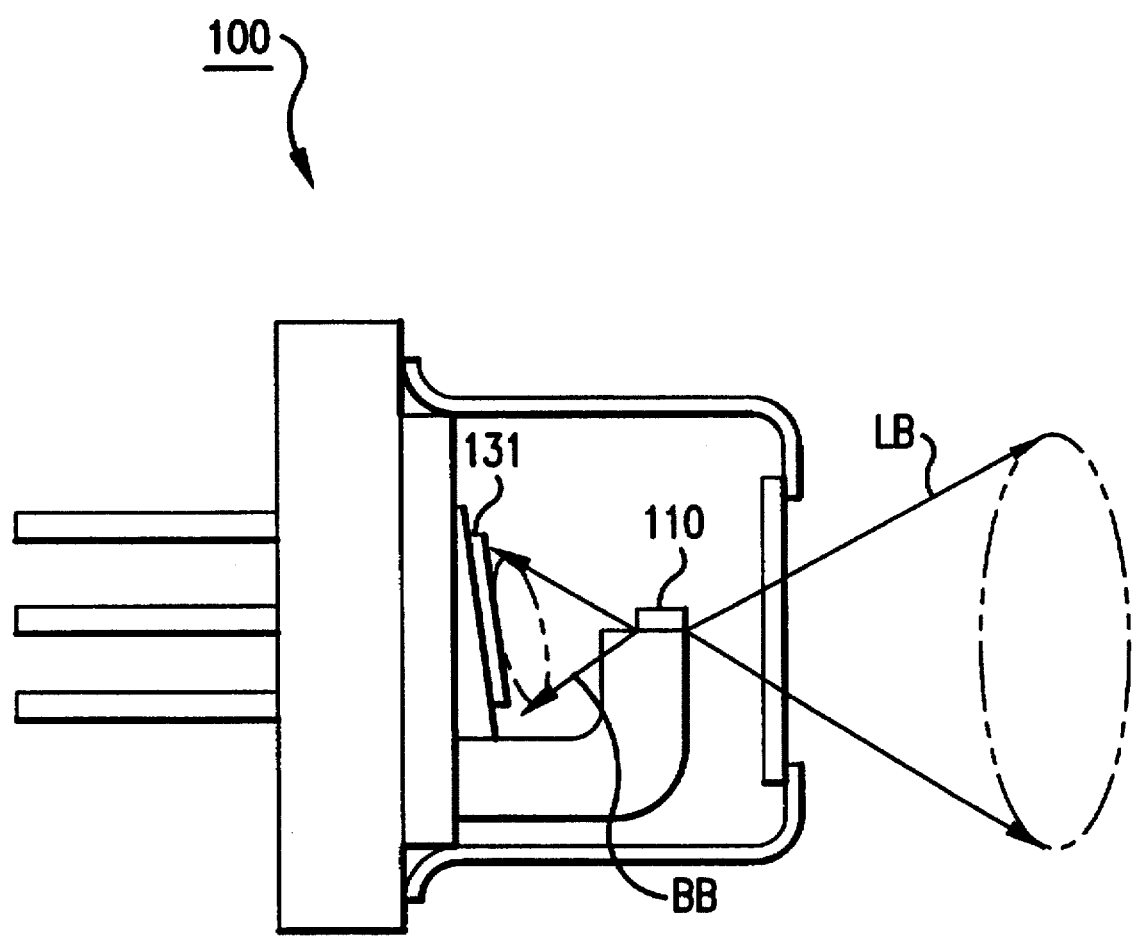
FIG. 8 is a sectional side view showing a conventional semiconductor laser light source.
Figure 9:
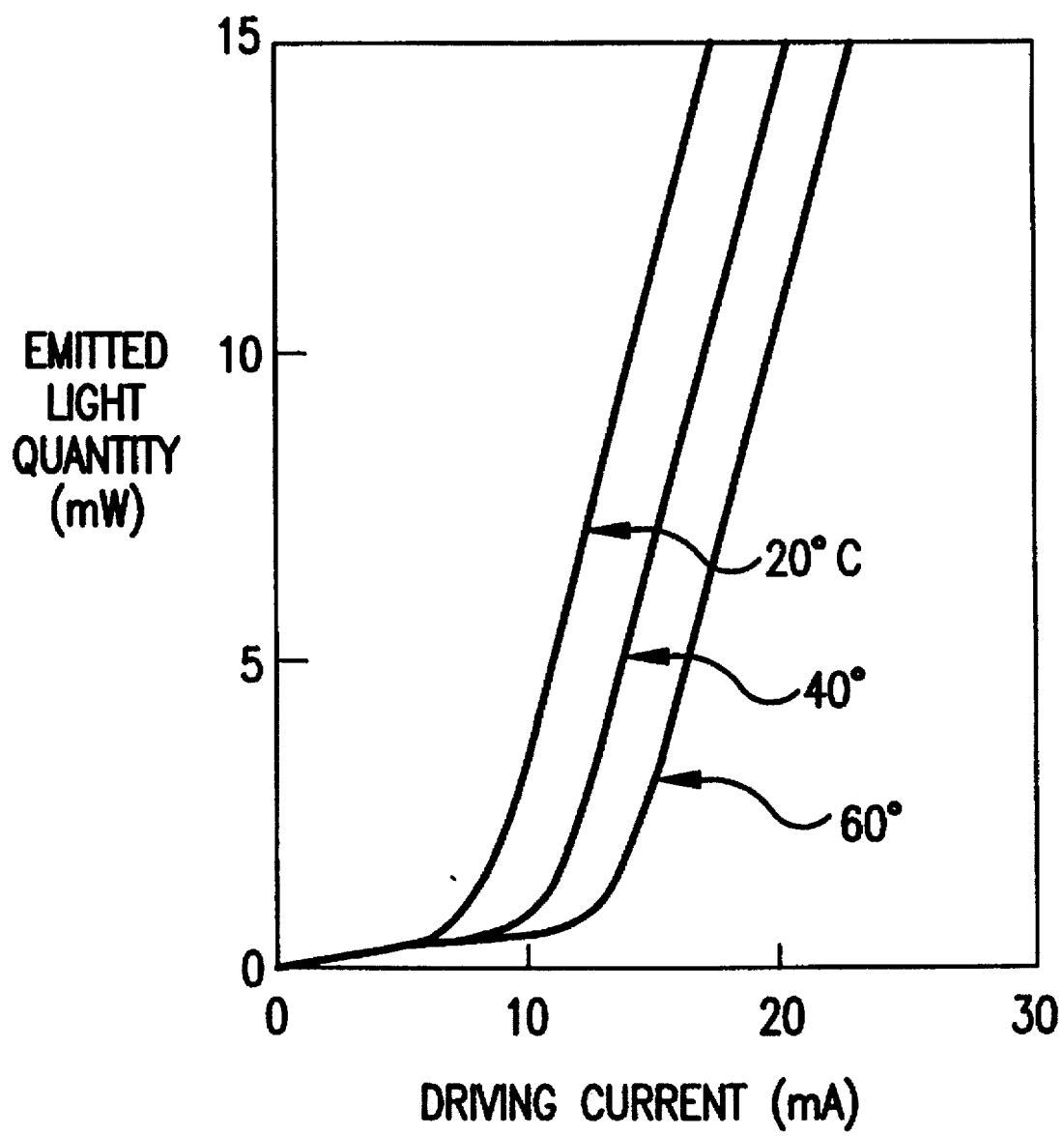
FIG. 9 is a graph showing the emission characteristics of conventional semiconductor laser elements.
Figure 10:
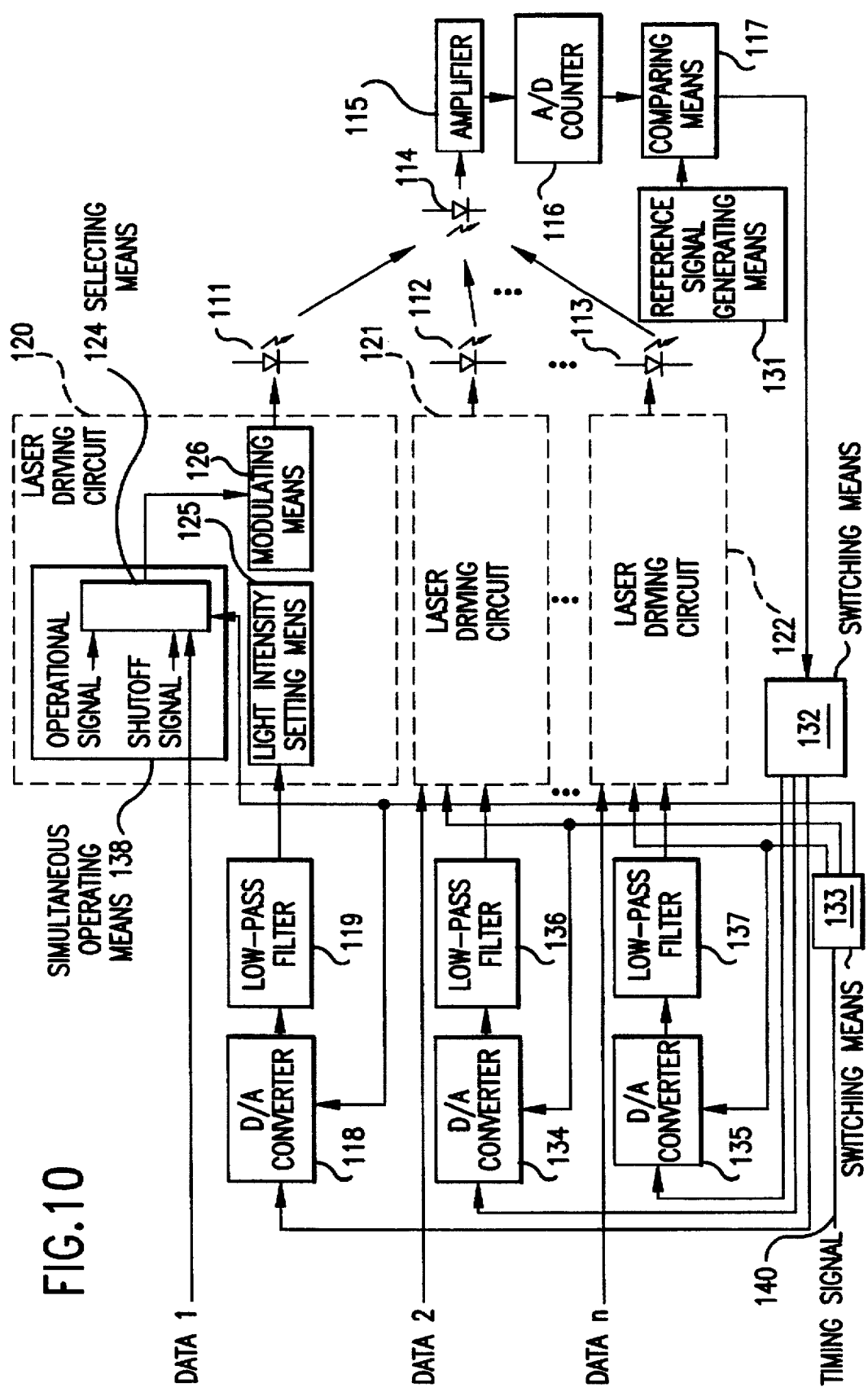
FIG. 10 is a block diagram showing the conventional light intensity control device.

FIG. 6 is a circuit diagram showing another example of the specific circuit configuration of the low-pass filter 9, the light intensity setting means 15, the modulating means 16, the light intensity balancing means 17, and the simultaneous operating means 13. In this example, the light intensity balancing means 17 is incorporated in the light intensity setting means 15. When the resistance value of a variable resistor VR is adjusted, the light intensity setting means 15 operates to increase or decrease a constant current value to be supplied to the modulating means 16.

The light intensity control device according to this preferred embodiment controls the light intensities of the laser beams emitted from the semiconductor laser light source in the following manner. First, the light intensity control device is instructed by a timing signal to start the light intensity control.

The timing signal is generated at a timing when the spot images 27 are present outside the recording region on the scanned body 23 with reference to a synchronizing signal generated from the beam detector 22 shown in FIG. 2 in the horizontal scanning direction. This purpose is to prevent a possibility that the simultaneous operating means 13 may be operated when the spot images 27 are present in the recording region on the scanned body 23, resulting in erroneous recording of data not to be recorded. To achieve this purpose more reliably, it is preferable to set so that the timing signal is allowed to be generated during a time interval from the end of a series of information recording job to the start of the next information recording job.

The laser driving circuit 10 operates the simultaneous operating means 13 incorporated therein in receipt of the timing signal to feed an operation signal to the modulating means 16, thereby operating the corresponding semiconductor laser element 1. This procedure is carried out similarly and simultaneously also in the laser driving circuits 11 and 12 respectively corresponding to the semiconductor laser elements 2 and 3.

The laser beams LB simultaneously emitted from the semiconductor laser elements 1, 2, and 3 simultaneously enter the light intensity detecting means 4 provided in the optical paths of the laser beams LB as shown in FIG. 1, and the light intensity detecting means 4 converts the light intensities of the laser beams LB into current values. Then, the current values are suitably amplified by the amplifier 5 which in turn converts the current values into voltage values. Then, the A/D converter 6 converts the voltage values into digital values, which are then fed as a detection output indicative of the sum of the light intensities to the comparing means 7.

Then, the comparing means 7 compares the detection output with the reference signal generated from the reference signal generating means 31, and instructs the D/A converter 8 to decrease the light intensities when the detection output is larger than the reference signal, increase the light intensities when the detection output is smaller than the reference signal, or hold the light intensities when the detection output is equal to the reference signal. Then, the set value changing means incorporated in the D/A converter 8 decreases its set value when instructed to decrease the light intensities, increase its set value when instructed to increase the light intensities, or hold its set value when instructed to hold the light intensities. Only when the timing signal remains input into the laser driving circuits 10, 11, and 12, the D/A converter 8 increases, decreases, or holds the set value according to the instruction from the comparing means 7, and then outputs an analog value according to the set value suitably changed or held above. When the input of the timing signal into the laser driving circuits 10, 11, and 12 is ended, the D/A converter 8 does not receive the instruction from the comparing means 7, but continues to hold the present set value and output an analog value according to the present set value.

The light intensity setting means 15 supplies to the modulating means 16 the output from the D/A converter 6 from which a noise component has been removed by the low-pass filter 9, and also supplies to the modulating means 16 a constant current according to the output from the light intensity balancing means 17.

The low-pass filter 9 simultaneously generates analog values to the laser driving circuits 10, 11, and 12. In general, however, the light intensities of the laser beams from the semiconductor laser elements 1, 2, and 3 are not equal to each other as shown in FIG. 4. Such a difference in light intensity is due to a subtle difference in luminous efficiency between the semiconductor laser elements 1, 2, and 3 and a subtle difference in characteristics between the laser driving circuits 10, 11, and 12.

The light intensity balancing means 17 is added to remove such a variation in light intensity, and it is adjusted by a serviceman or the like in constructing the semiconductor laser scanning device or replacing the semiconductor laser light source.

Finally, the modulating means 16 modulates the currents supplied from the light intensity setting means 15 according to the signals from the simultaneous operating means 13, and supplies the modulated currents to the semiconductor laser elements 1, 2, and 3, thus driving them.

The above procedure is carried out similarly and simultaneously also in the laser driving circuits 11 and 12 and in the semiconductor laser elements 2 and 3. When the input of the timing signal is ended, the light intensity control is ended. In a normal operation of the machine, the outputs of the semiconductor laser elements 1, 2, and 3 before starting the light intensity control are relatively close to target light intensities. Accordingly, once the timing signal is input, the light intensities of the laser beams from the semiconductor laser light source can be converged to a given value. On the other hand, in the case where the outputs of the semiconductor laser elements 1, 2, and 3 are quite different from the target light intensities (e.g., upon turning on the power or after allowing the machine to stand for a long period of time), the timing signal is repeatedly input plural times to thereby converge the light intensities of the laser beams from the semiconductor laser light source to a given value.

Second Preferred Embodiment

A second preferred embodiment of the present invention will now be described with reference to the drawings.

While the description of the first preferred embodiment has been directed to a light beam recording and scanning device of a so-called light beam deflection type such that a light beam is deflected by a polygon mirror to scan in a horizontal scanning direction, the following preferred embodiment relates to a light beam recording and scanning device of a so-called image bar type such that an image bar formed by arranging a plurality of light emitting elements in a transverse direction of a recording medium is used and the light emitting elements for directing light beams from the image bar along a longitudinal direction of the recording medium are selectively operated to thereby scan an exposure position on the recording medium, thus forming an image.

Figure 11:
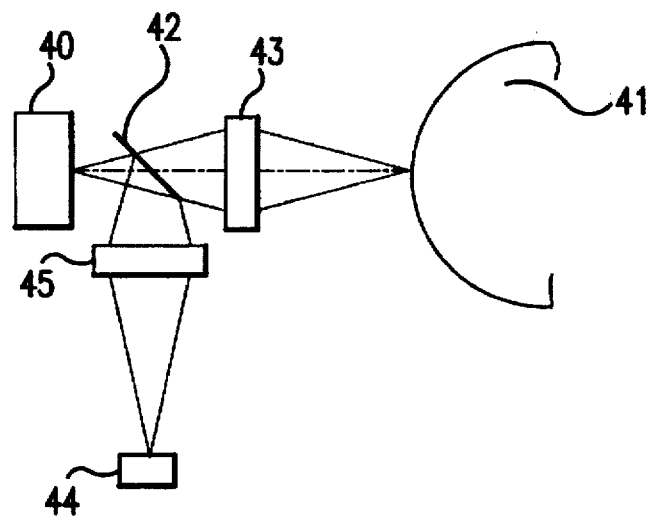
FIG. 11 is an elevational view showing a second preferred embodiment of the laser image forming device employing the light intensity control device according to the present invention.
Figure 12:
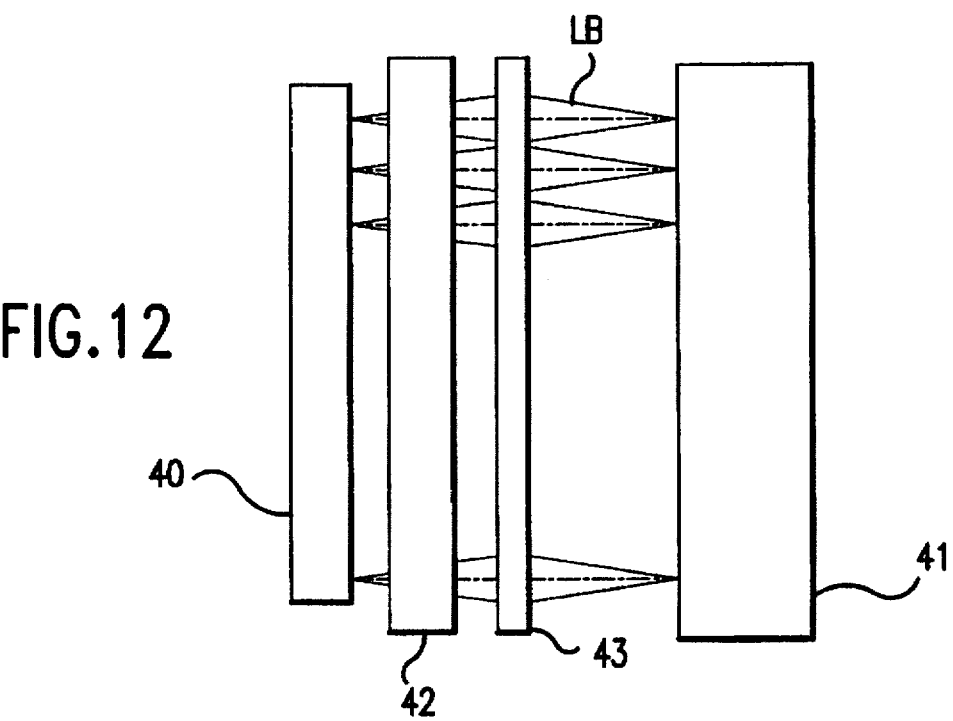
FIG. 12 is a top plan view showing the second preferred embodiment.
Figure 13:
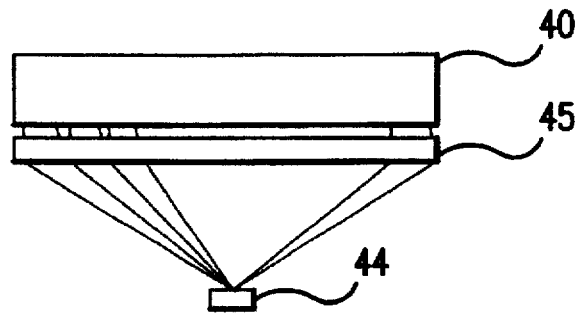
FIG. 13 is a side view showing the second preferred embodiment.

FIGS. 11 to 13 show the second preferred embodiment of a multibeam image forming device to which the light intensity control device according to the present invention is applied. More specifically, FIG. 11 is an elevational view; FIG. 12 is a top plan view; and FIG. 13 is a side view.

Referring to FIGS. 11 to 13, reference numeral 40 denotes a semiconductor laser array light source. As disclosed in Japanese Patent Laid-open No. 64-42667 (1989), for example, the semiconductor laser array light source 40 is configured by linearly arranging many semiconductor laser elements over the same width as that of a recording region of a photosensitive drum 41 according to a recording density of an image. The semiconductor laser array light source 40 may be replaced by an LED array light source or the like. The semiconductor laser array light source 40 is designed to emit 2000 to 40000 laser beams LB modulated according to a data signal by a driver (not shown) to thereby perform image exposure on the photosensitive drum 41. The number of the laser beams LB is determined by a resolution required by the image forming device. The above-mentioned data signal includes image data read by an image reading device (not shown), image data of computer graphics, character information, and other many kinds of image information. Although the semiconductor laser array light source 40 is used in this preferred embodiment, the description of this preferred embodiment can be fully applied also to an LED array light source.

As shown in FIGS. 11 and 12, the plural laser beams LB emitted from the semiconductor laser array light source 40 are introduced through a half mirror 42 to a microlens array 43 such as a Selfoc lens (registered trade name), and are next focused on the photosensitive drum 41 by the microlens array 43. Thus, an electrostatic latent image according to image information is formed on the photosensitive drum 41. This electrostatic latent image is next developed to form a visible image.

The half mirror 42 functions to partially introduce the laser beams LB to light intensity detecting means 44. A condenser lens 45 is provided between the half mirror 42 and the light intensity detecting means 44 to collect all the laser beams LB at one position so that the light intensity detecting means 44 can detect all the laser beams LB at a time.

A photosensitive member on the photosensitive drum 41 may be selected from any photosensitive materials that are changed in their physical or chemical characteristics by light to enable recording of information. Examples of such a photosensitive member may include an electrophotographic photosensitive member utilizing photoconductivity and a silver salt photographic film.

The light intensity control device applied to the light beam image forming device configured above is characterized in that it includes a light source having a plurality of light emitting elements for emitting a plurality of laser beams, and operating means for simultaneously operating all the light emitting elements of the light source, wherein the total quantity of light from all the light emitting elements is controlled according to a detection output from the detecting means.

The light intensity control device used in this preferred embodiment is the same as that used in the first preferred embodiment shown in FIG. 1, and the operation is also the same. In FIG. 1, the number of channels, n, becomes equal to the number of the light emitting elements of the semiconductor laser array light source 40, i.e., 2000 to 40000, thus forming a very large parallel circuit. However, as compared with the prior art, the number of the D/A converters and the lowpass filters can be reduced by (n−1), thus providing preference. A specific circuit configuration of the light intensity control device in this preferred embodiment is similar to that shown in FIG. 5 or 6.

The present invention is characterized in that the same technique can be applied commonly to both the first preferred embodiment employing a relatively small number of laser beams and the second preferred embodiment employing a great number of laser beams.

Third Preferred Embodiment

A third preferred embodiment of the present invention will now be described with reference to the drawings.

Figure 14:
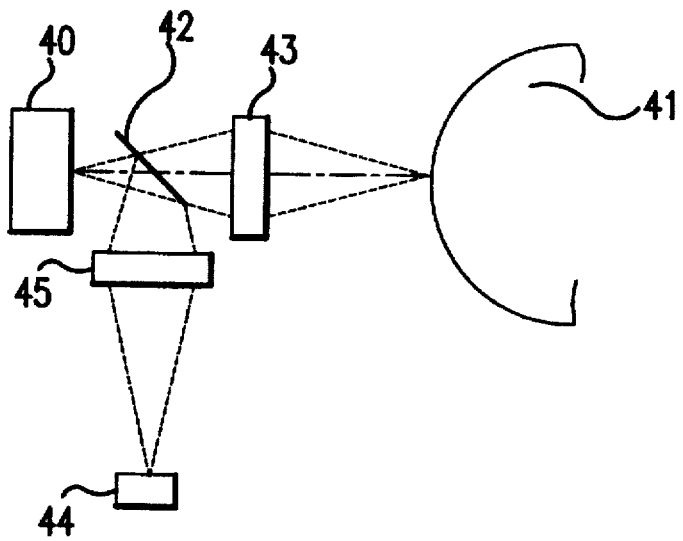
FIG. 14 is an elevational view showing a third preferred embodiment of the laser image forming device employing the light intensity control device according to the present invention.
Figure 15:
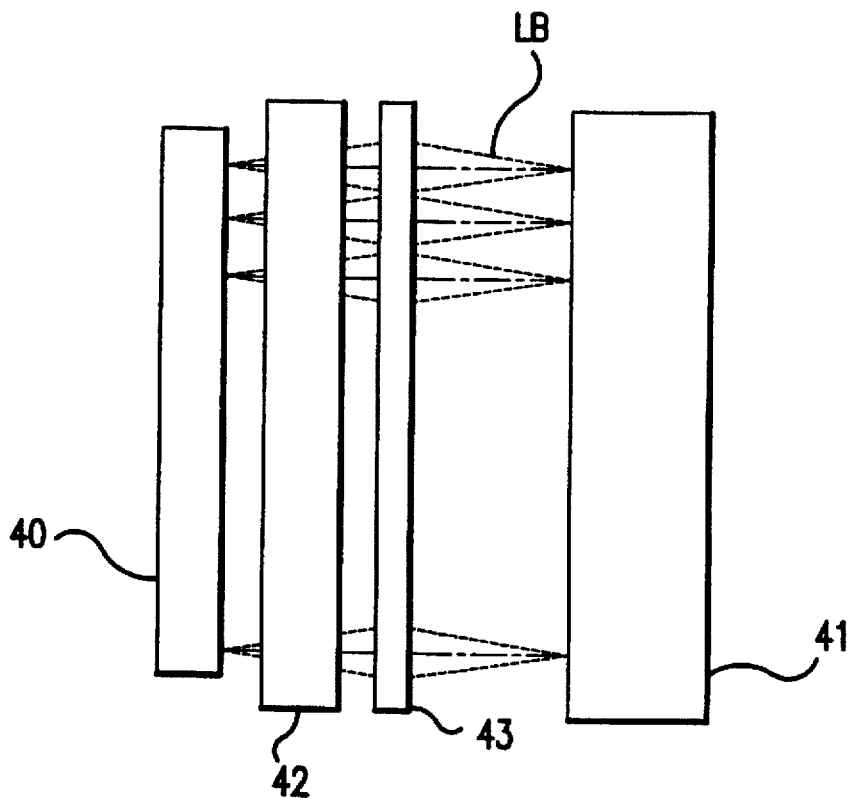
FIG. 15 is a top plan view showing the third preferred embodiment.
Figure 16:
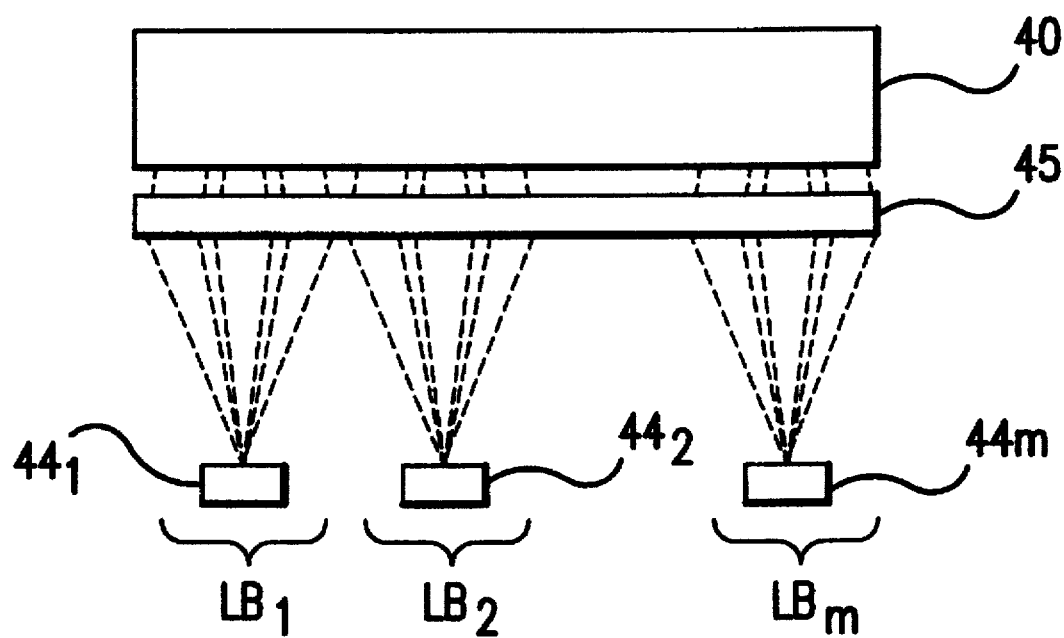
FIG. 16 is a side view showing the third preferred embodiment.

FIGS. 14 to 16 show the third preferred embodiment of the multibeam image forming device to which the light intensity control device according to the present invention is applied. More specifically FIG. 14 is an elevational view; FIG. 15 is a top plan view; and FIG. 16 is a side view.

Referring to FIGS. 14 to 16, reference numeral 40 denotes a semiconductor laser array light source or an LED array light source. The semiconductor laser array light source of the LED array light source 40 is configured by arranging a plurality of light emitting elements over the same width as that of a recording region of a photosensitive drum 41. The semiconductor laser array light source or the LED array light source 40 is designed to emit 2000 to 40000 laser beams LB modulated according to a data signal by a driver (not shown). Although the light source 40 will be identified as the semiconductor laser array light source in the following description of the second preferred embodiment for simplicity of illustration, the description can be fully applied also to the LED array light source.

As shown in FIGS. 14 and 15, the plural laser beams LB emitted from the semiconductor laser array light source 40 are introduced through a half mirror 42 to a microlens array 43, and are next focused on the photosensitive drum 41 by the microlens array 43. Thus, an electrostatic latent image according to image information is formed on the photosensitive drum 41. This electrostatic latent image is next developed to form a visible image.

The half mirror 42 functions to partially introduce the laser beams LB to a plurality of light intensity detecting means $44_1$, $44_2$, . . . , $44_m$. A condenser lens array 45 is provided between the half mirror 42 and the light intensity detecting means $44_1$, $44_2$, $44_m$ so that each of the light intensity detecting means $44_1$, $44_2$, . . . , $44_m$ can detect some of the plural laser beams LB at a time. In this manner, the plural laser beams LB are separately detected by the plural light intensity detecting means $44_1$, $44_2$, . . . , $44_m$ rather than collectively detected by the single light intensity detecting means 44 as in the second preferred embodiment. Accordingly, even when the width of the recording region of the photosensitive drum 41 is very large, the light intensities of the plural laser beams LB can be reliably detected according to the third preferred embodiment.

The light intensity control device applied to the light beam image forming device configured above is characterized in that it includes a plurality of detecting means for detecting the light intensities of a plurality of light beams emitted from a light source, the number of the plural detecting means being smaller than the number of the light beams, and operating means for simultaneously operating some of plural light emitting elements of the light source, wherein the total light intensity of the light beams from the some light emitting elements simultaneously operated by the operating means is simultaneously detected by the detecting means, and the total light intensity of all the light emitting elements simultaneously operated by the operating means is controlled according to detection outputs from the plural detecting means.

Referring to FIG. 16, it is assumed that the number of the light intensity detecting means $44_1$, $44_2$, . . . , $44_m$ is set to m. In this case, the plural laser beams LB emitted from the semiconductor laser array light source 40 are grouped into m components 1 to m, which respectively correspond to components $LB_1$, $LB_2$, . . . , $LB_m$. The components $LB_1$, $LB_2$, . . . , $LB_m$ are respectively allocated to the light intensity detecting means $44_1$, $44_2$, . . . , $44_m$. The light intensity control device in this preferred embodiment may be similar in configuration and operation to the light intensity control device in the first preferred embodiment shown in FIG. 1. However, the number of channels, n, in this preferred embodiment becomes as follows:

The number of channels, n=(the number of the light emitting elements of the semiconductor laser array light source)/m.

The number of such light intensity control devices is set to m, and all the light intensity control devices are respectively allocated to the components $LB_1$, $LB_2$, . . . , $LB_m$. As a result, many light emitting elements can be controlled.

Fourth Preferred Embodiment

A fourth preferred embodiment of the present invention will now be described with reference to the drawings.

The configuration of a multibeam image forming device according to the fourth preferred embodiment to which the light intensity control device according to the present invention is applied is the same as that according to the second preferred embodiment shown in FIGS. 11 to 13, in which FIG. 11 is an elevational view; FIG. 12 is a top plan view; and FIG. 13 is a side view.

Referring to FIGS. 11 to 13, reference numeral 40 denotes a semiconductor laser array light source or an LED array light source. The semiconductor laser array light source or the LED array light source 40 is configured by arranging a plurality of light emitting elements over the same width as that of a recording region of a photosensitive drum 41. The semiconductor laser array light source or the LED array light source 40 is designed to emit 2000 to 40000 light beams LB modulated according to a data signal by a driver (not shown). Although the light source 40 will be identified as the semiconductor laser array light source in the following description of the fourth preferred embodiment for simplicity of illustration, the description can be fully applied also to the LED array light source.

The light intensity control device applied to the light beam image forming device configured above is characterized in that it includes one detecting means for detecting the light intensities of a plurality of light beams emitted from a light source, and operating means for simultaneously operating some of plural light emitting elements of the light source, wherein the total light intensity of the light beams from the some light emitting elements simultaneously operated by the operating means is simultaneously detected by the detecting means, and the total light intensity of all the light emitting elements simultaneously operated by the operating means is controlled according to a detection output from the detecting means.

Figure 17:
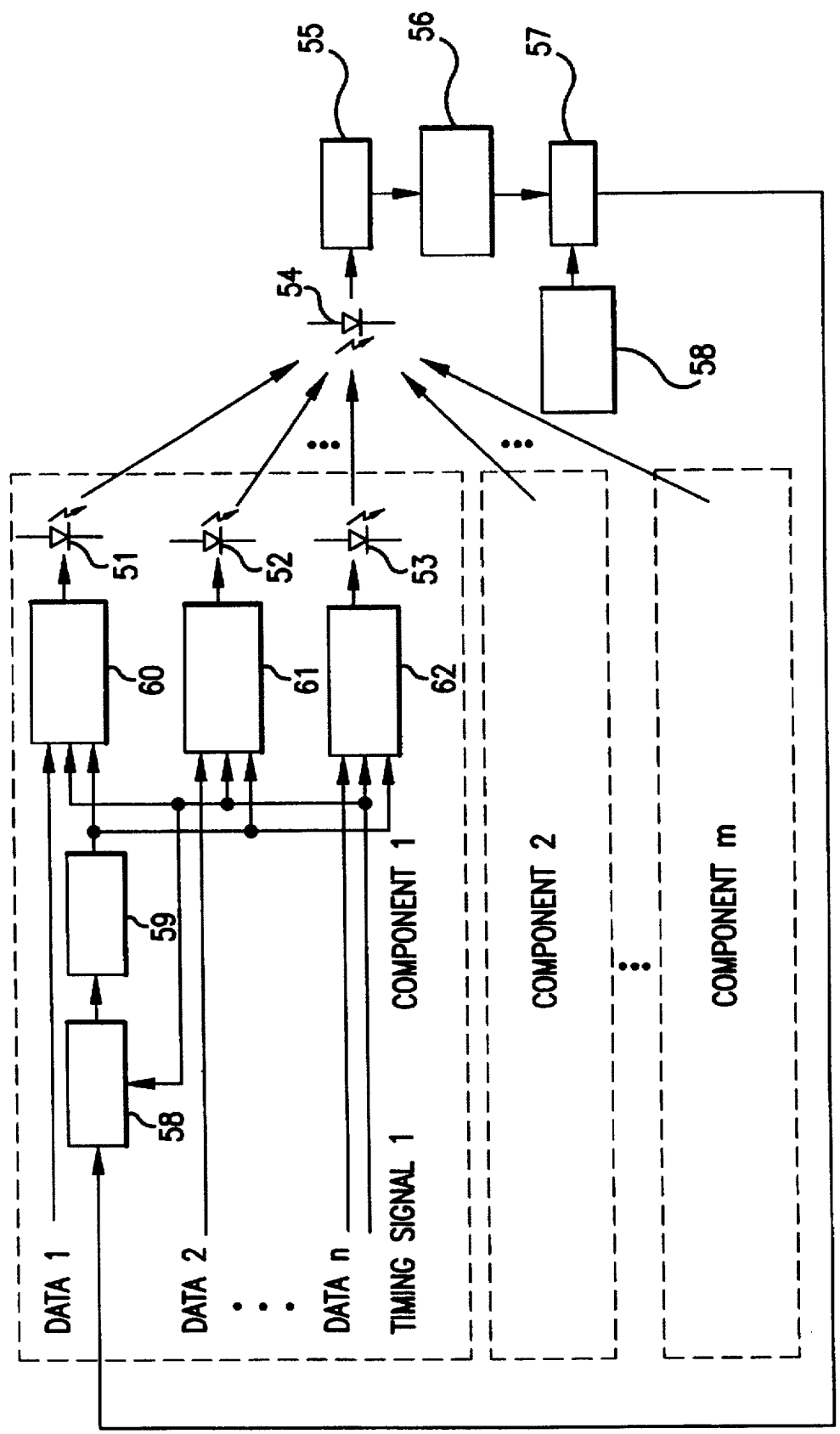
FIG. 17 is a block diagram showing a fourth preferred embodiment of the light intensity control device according to the present invention.
Figure 18:
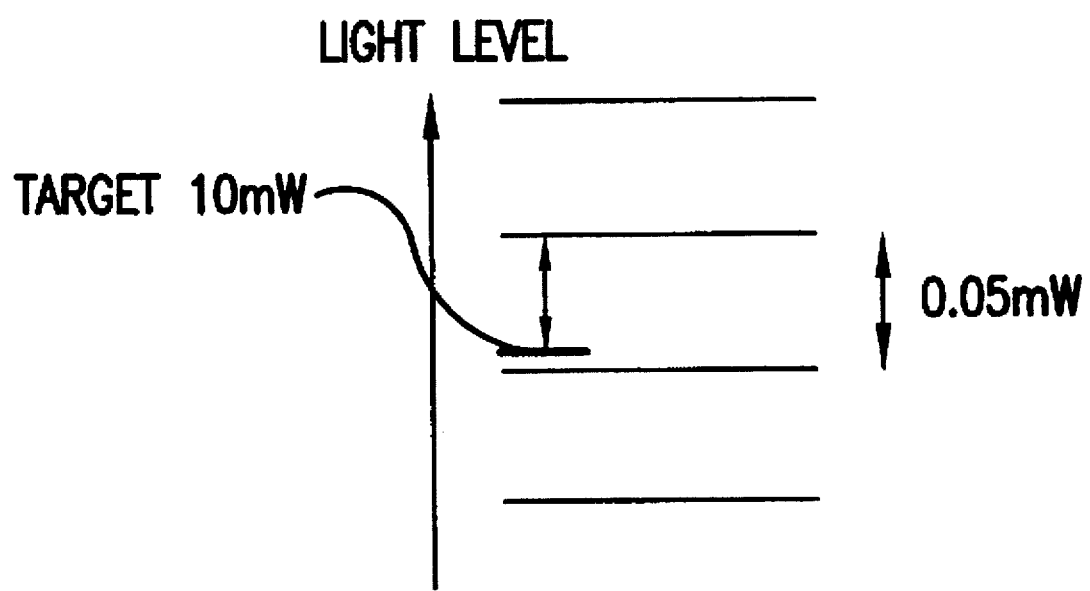
FIG. 18 is a view illustrating the operation of a D/A converter in the conventional light intensity control device.

FIG. 17 shows a preferred embodiment of the light intensity control device according to the present invention.

Referring to FIG. 17, reference numerals 51, 52, and 53 denote a plurality of semiconductor laser elements constituting a semiconductor laser array light source. The light intensities of laser beams LB emitted from these semiconductor laser elements 51, 52, and 53 are detected by light intensity detecting means 54 located in a optical path of the laser beams LB. The light intensity detecting means 54 is configured by an opto-electric conversion element, and a photodiode is usually adopted as the opto-electric conversion element.

The light intensity detecting means 54 having detected the laser beams LB emitted from the semiconductor laser elements 51, 52, and 53 generates a detection output according to the magnitude of the sum of the light intensities of the laser beams LB. The detection output from the light intensity detecting means 54 is amplified by an amplifier 55 and then converted into a digital value by an A/D converter 56. Then, the digital value is compared in magnitude with a reference signal output from reference signal generating means 63 by comparing means 57. The result of this comparison is next output to a D/A converter 58 incorporated in each of the components 1 to m of the light intensity control device.

Thus, an output signal from the comparing means 57 is received by the D/A converter 58 incorporated in each of the components 1 to m. The D/A converter 58 contains set value changing means (not shown). When the output from the light intensity detecting means 54 is larger than the reference signal, the set value changing means decreases its own set value, whereas when the output from the light intensity detecting means 54 is smaller than the reference signal, the set value changing means increases its own set value.

A low-pass filter 59 is connected to the D/A converter 58, so as to remove a noise component contained in an output from the D/A converter 58 and next feed the output to light intensity setting means incorporated in laser driving circuits 60, 61, and 62.

Like the first to third preferred embodiments each of the laser driving circuits 60, 61, and 62 includes the light intensity setting means, modulating means, light intensity balancing means, and simultaneous operating means. Each component includes the single D/A converter 58, the single low-pass filter 59, the plural laser driving circuits 60 to 62 whose number is set to n, and the plural light emitting elements 51 to 53 whose number is set to n. The light intensity control device as a whole according to this preferred embodiment includes a plurality of such components whose number is set to m. Accordingly, the whole of the components 1 to m performs light intensity control for the (m×n) light emitting elements constituting the semiconductor laser array light source 40.

In the above configuration, the light intensity control device according to this preferred embodiment controls the light intensities of the laser beams emitted from the semiconductor laser array light source in the following manner. Referring to FIG. 17, the laser driving circuits 60 to 62 are first instructed by a timing signal 1 to start light intensity control in the component 1.

The laser driving circuit 60 operates its own simultaneous operating means in receipt of the timing signal 1, and next feeds an operating signal to the modulating means, thereby operating the corresponding semiconductor laser element 51. This procedure is similarly performed also in the other laser driving circuits 61 and 62 respectively corresponding to the semiconductor laser elements 52 and 53. Thus, the semiconductor laser elements 51 to 53 simultaneously start operating.

The laser beams LB simultaneously emitted from the semiconductor laser elements 51 to 53 enter the light intensity detecting means 54 located in the optical path of the laser beams LB, and the light intensities of the laser beams LB are converted into current values in the light intensity detecting means 54. The current values are suitably amplified and next converted into voltage values by the amplifier 55. Then, the voltage values are converted into digital values by the A/D converter 56, and the digital values are next fed as a detection output indicative of the sum of the light intensities to the comparing means 57.

Then, the comparing means 57 compares the detection output with the reference signal generated from the reference signal generating means 63, and instructs the D/A converter 58 incorporated in each of the components 1 to m to decrease the light intensities when the detection output is larger than the reference signal, increase the light intensities when the detection output is smaller than the reference signal, or hold the light intensities when the detection output is equal to the reference signal.

Then, the set value changing means incorporated in the D/A converter 58 decreases its set value when instructed to decrease the light intensities, increase its set value when instructed to increase the light intensities, or hold its set value when instructed to hold the light intensities. Only when the timing signal remains input to the laser driving circuits 60 to 62, the D/A converter 58 in each component increases, decreases, or holds the set value according to the instruction from the comparing means 57, and then outputs an analog value to the low-pass filter 59 according to the set value suitably changed or held above. When the input of the timing signal into the laser driving circuits 60 to 62 is ended, the D/A converter 58 does not receive the instruction from the comparing means 57, but continues to hold the present set value and output an analog value according to the present set value. While the light intensity control for the component 1 is being carried out, the timing signal in the component 1 only is effective. As a result, the D/A converter 58 in the component 1 only increases, decreases, or holds the set value.

In each of the laser driving circuits 60 to 62, a constant current according to the output from the D/A converter 58 from which a noise component has been removed by the low-pass filter 59 and according to the output from the light intensity balancing means is supplied to the modulating means. Then, the modulating means modulates this constant current according to the signal from the simultaneous operating means, and supplies the modulated current to the semiconductor laser elements 51 to 53, thus driving them.

After the input of the timing signal 1 is ended the light intensity control for the component 1 according to the above procedure is ended. Subsequently, the light intensity control for the other components 2 to m is performed in the same procedure as mentioned above.

The present invention can be applied to the case where the number of light emitting elements such as semiconductor laser elements is very large ranging from hundreds to ten thousands. For the light source having many semiconductor laser elements, adjustment of the light intensity balancing means is carried out by a service man or the like in assembling of a semiconductor laser device or in replacement of a semiconductor laser light source. Accordingly, even when the light intensities of the semiconductor laser elements are once balanced, there is a possibility that the balance of the light intensities may be lost by a change in characteristics of the semiconductor laser elements due to their aged deterioration or a change in ambient temperature.

In view of this possibility, the present inventors conducted the following test on light intensity balance. First, many (18) semiconductor laser elements each having two light emitting points were prepared, and the light intensity balance between two laser beams emitted from the two light emitting points was next adjusted at a temperature of 15° C. Thereafter, the light intensity balance was checked (by setting the intensity of one of the two laser beams to 100% and then determining an increase in intensity of the other laser beam whose intensity was originally 100%) under the following three conditions:

(1) At a raised temperature of 60° C.:

(2) At a temperature of 15° C. after continuous emission for 132 hours: and (3) At a raised temperature of 60° C. after continuous emission for 1320 hours.

The result of this test is as follows:

(1) The average of the 18 elements was +0.6% and the standard deviation of the 18 elements was 1.1%;

(2) The average of the 18 elements was −0.5% and the standard deviation of the 18 elements was 1.5%, and (3) The average of the 18 elements was −0.2%, and the standard deviation of the 18 elements was 1.8%.

As understood from the above test result, the average of the 18 elements is small as ranging from +0.6% to −0.5%. In the present invention, the total light quantity of plural light beams from plural semiconductor laser elements is detected, and the light intensity of the light beam from each semiconductor laser element is controlled according to the total light quantity detected above. Therefore, a variation in the total light quantity of the light beams from the plural semiconductor laser elements that is, a variation in the average of the light intensities of the light beams from the plural Semiconductor laser elements, can be automatically corrected. Accordingly, the average of the 18 elements is not so important. To the contrary, the standard deviation of the 18 elements is important because it represents a degree of loss of the light intensity balance in the case where the characteristics of the semiconductor laser elements change with their aged deterioration or a change in ambient temperature. However, as apparent from the above test result, the standard deviation of the 18 elements is small as ranging from 1.1% to 1.8%. Therefore, a change in characteristics of the semiconductor laser elements due to their aged deterioration or a change in ambient temperature is small, so that there is no possibility that the light intensity balance may be lost.

Thus, according to this preferred embodiment, the light intensities of the laser beams from the semiconductor laser light source can be converged into a given value in a short time without undue complicated configuration.

In the case where the number of the laser beams LB is two, the total time required to perform the light intensity control in this preferred embodiment is not so quite different from that in the prior art. However, when the number of the laser beams LB is increased to four, eight, and so on, the total time required to perform the light intensity control in this preferred embodiment can be greatly reduced as compared with the prior art, thus exhibiting the remarkable effect of this preferred embodiment.

As described above, according to the present invention, it is possible to provide a light intensity control device which can reduce the time required to perform the control of light intensities of laser beams from semiconductor laser elements when the number of the laser beams is increased, thereby more greatly exhibiting the effect of high-speed operation obtained by the increase in number of the laser beams.

Further, it is possible to provide a light intensity control device which can be manufactured with a simple configuration, thereby allowing size reduction and cost reduction of a semiconductor laser scanning device.

Further, the present invention can provide an intensity control device, a light beam radiating device, and a light beam recording and scanning device which can accurately control the total light quantity of light beams even when the number of the light beams is increased, without an increase in cost due to a resolution of the D/A converter.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A light intensity control device comprising:

total light quantity detecting means for detecting a total light quantity of a plurality of light beams simultaneously generated from a light source having a plurality of light emitting elements for generating said plurality of light beams;

light intensity balancing means for adjusting a variation in light intensity between said light emitting elements of said light source; and control means for simultaneously turning on said light emitting elements whose variation in light intensity has been adjusted by said light intensity balancing means, controlling said total light quantity detecting means to detect the total light quantity of said light beams from said light emitting elements turned on, and adjusting the total light quantity of said light beams from said light emitting elements according to a detection value output from said total light quantity detecting means.

2. A light beam radiating device comprising:

a light source having a plurality of light emitting elements for simultaneously generating a plurality of light beams;

total light quantity detecting means for detecting a total light quantity of said plurality of light beams simultaneously generated from said light source;

light intensity balancing means for adjusting a variation in light intensity between said light emitting elements of said light source; and control means for simultaneously turning on said light emitting elements whose variation in light intensity has been adjusted by said light intensity balancing means, controlling said total light quantity detecting means to detect the total light quantity of said light beams from said light emitting elements turned on, and adjusting the total light quantity of said light beams from said light emitting elements according to a detection value output from said total light quantity detecting means.

3. A light beam radiating device according to claim 2, wherein said control means comprises:

comparing means for comparing said total light quantity detected by said total light quantity detecting means with a reference value; and light intensity setting means for setting the light intensities of said light beams from said light emitting elements according to a result of comparison obtained by said comparing means.

4. A light beam radiating device according to claim 3, wherein said light intensity balancing means is adapted to change output characteristics of said light intensity setting means for each of said light emitting elements according to the result of comparison obtained by said comparing means.

5. A light beam radiating device according to claim 3, wherein said light intensity setting means is adapted to individually set the light intensities of said light beams from said light emitting elements.

6. A light beam radiating device according to claim 2, wherein said total light quantity detecting means is adapted to simultaneously detect the total light quantity of said light beams from all said light emitting elements.

7. A light beam radiating device according to claim 2, wherein:
   all said light emitting elements are grouped into a plurality of components each comprising a plurality of light emitting elements;
   said total light quantity detecting means is adapted to detect a total light quantity of light beams from said light emitting elements contained in each component; and
   said control means is adapted to adjust the total light quantity of said light beams from said light emitting elements contained in each component according to a detection value output from said total light quantity detecting means.

8. A light beam radiating device according to claim 7, wherein said total light quantity detecting means comprises a plurality of total light quantity detecting means provided so as to correspond to said plurality of components of said light source.

9. A light beam radiating device according to claim 2, wherein said light source comprises an image bar.

10. A light beam recording and scanning device comprising:

a light source having a plurality of light emitting elements for simultaneously generating a plurality of light beams;

a photosensitive medium adapted to be irradiated with said light beams from said light source;

total light quantity detecting means for detecting a total light quantity of said plurality of light beams simultaneously generated from said light source;

light intensity balancing means for adjusting a variation in light intensity between said light emitting elements of said light source;

control means for simultaneously turning on said light emitting elements whose variation in light intensity has been adjusted by said light intensity balancing means, controlling said total light quantity detecting means to detect the total light quantity of said light beams from said light emitting elements turned on, and adjusting the total light quantity of said light beams from said light emitting elements according to a detection value output from said total light quantity detecting means; and scanning means for applying to said photosensitive medium said light beams whose total light quantity has been adjusted by said control means.

* * * * *